(12) United States Patent
Schwartz et al.

(10) Patent No.: US 8,573,082 B2
(45) Date of Patent: Nov. 5, 2013

(54) DRIVE CARTRIDGE

(75) Inventors: Simon Schwartz, Dahn (DE); Georg Jungmann, Gorxheimertal (DE); Helko Lang, Neulussheim (DE); Harald Schmitt, Mannheim (DE); Alexander Rothermel, Mannheim (DE)

(73) Assignee: Friatec Aktiengesellschaft, Mannheim (DE)

( * ) Notice: Subject to any disclaimer, the term of this patent is extended or adjusted under 35 U.S.C. 154(b) by 142 days.

(21) Appl. No.: 12/998,496

(22) PCT Filed: Oct. 30, 2009

(86) PCT No.: PCT/DE2009/001517
§ 371 (c)(1),
(2), (4) Date: May 17, 2011

(87) PCT Pub. No.: WO2010/048942
PCT Pub. Date: May 6, 2010

(65) Prior Publication Data
US 2011/0265587 A1    Nov. 3, 2011

(30) Foreign Application Priority Data
Oct. 31, 2008    (DE) .......................... 10 2008 054 103

(51) Int. Cl.
*F16H 27/02*    (2006.01)
(52) U.S. Cl.
USPC .................... 74/89.33; 74/89.36; 74/89.42
(58) Field of Classification Search
USPC ............ 74/89.23, 89.25, 89.26, 89.32, 89.33, 74/89.35, 89.36, 89.42
See application file for complete search history.

(56) References Cited

U.S. PATENT DOCUMENTS

| | | |
|---|---|---|
| 1,958,988 A | 5/1934 | Eisele |
| 3,820,564 A | 6/1974 | Wagner |
| 4,543,813 A | 10/1985 | Rogers |

(Continued)

FOREIGN PATENT DOCUMENTS

| | | |
|---|---|---|
| DE | 102 07 613 C1 | 4/2003 |
| DE | 10 2006 030 027 A1 | 1/2008 |

(Continued)

OTHER PUBLICATIONS

Andreas Maiwald; "Numerical investigation of out-of-roundness profile contours for shaft-hub connections" (Numerishce Untersuchungen von unrunden Profilkonturen fuer Welle-Nabe-Verbindungen); Diplomarbeit Nr. KTK/20/2008; Diploma Thesis; Sep. 10, 2008; 78 pages; WestSaxonian University Zwickau (FH) (Westsaechsischen Hochschule Zwickau (FH)).

(Continued)

*Primary Examiner* — David M Fenstermacher
(74) *Attorney, Agent, or Firm* — Marshall & Melhorn, LLC (57) ABSTRACT

A drive cartridge comprises an actuating mechanism, in which a spindle can be guided in a hollow cylindrical drive element between two end positions at an axial distance from one another. The positions are defined by the axial length of the drive element. A dome-shaped casing surrounds the drive element in a non-rotatable and non-displaceable manner. The drive element has an external contour with an eccentric profile and the internal contour of the dome-shaped casing has a positive fit only in those areas of the drive element in which the permissible normal stress exceeds a predefined upper limit.

13 Claims, 6 Drawing Sheets

(56) References Cited

U.S. PATENT DOCUMENTS

| | | | |
|---|---|---|---|
| 4,939,946 A * | 7/1990 | Teramachi | 74/89.3 |
| 5,377,956 A * | 1/1995 | Muller | 251/331 |
| 5,520,416 A * | 5/1996 | Singer et al. | 280/775 |
| 5,913,763 A * | 6/1999 | Beran et al. | 49/506 |
| 6,119,541 A * | 9/2000 | Robinson | 74/441 |
| 6,718,837 B2 * | 4/2004 | Sato et al. | 74/89.33 |
| 6,848,327 B2 * | 2/2005 | Nagai et al. | 74/89.33 |
| 7,062,985 B2 * | 6/2006 | Bauer | 74/89.32 |
| 7,066,041 B2 * | 6/2006 | Nielsen | 74/89.35 |
| 7,216,559 B2 * | 5/2007 | Kuo et al. | 74/89.32 |
| 7,219,570 B2 * | 5/2007 | Erikson et al. | 74/89.42 |
| 7,793,561 B2 * | 9/2010 | Greilinger et al. | 74/424.72 |
| 7,798,172 B2 | 9/2010 | Leutwyler et al. | |
| 7,997,190 B2 * | 8/2011 | Patton | 100/289 |
| 8,166,838 B2 * | 5/2012 | Shirai et al. | 74/89.32 |
| 8,316,729 B2 * | 11/2012 | Schunke | 74/89.23 |
| 2009/0294718 A1 | 12/2009 | Schwarz et al. | |

FOREIGN PATENT DOCUMENTS

| | | |
|---|---|---|
| EP | 0 711 947 A1 | 5/1996 |
| EP | 1 852 558 A1 | 11/2007 |
| GB | 613 520 A | 11/1948 |
| WO | WO 02/094536 A1 | 11/2002 |

OTHER PUBLICATIONS

EMS Chemie AG: Technical instruction card; (Technisches Merkblatt); Grivory HT1V-4 FWA Schwarz 9225; 2006; 6 pages; Grivory GV; Domat/Ems, Switzerland, Jan. 2006.

Continental AG; "Bionic—Trends in industry and society and applications within Continental AG" (Bionik—Trends in Industrie und Gesellschaft und Anwendungen bei der Continental); Jun. 2002; 30 pages; Technology Communication.

* cited by examiner

FEM Calculation
- Actual state with internal pressure and torque -

| | |
|---|---|
| Model name: RD_DN100_VAR00 | Creator: T 416 | Date: 10.01.2008 |
| Calculation object: simulation internal pressure 16 bar und torque 240 Nm ||
| Material indication: Bronze (from Mechanica Bib.) (drive segment) <br> Grivory GV 4H (Polyamide with 40% glass fiber fraction) (dome-shaped casing) <br> Tensile E modulus 13000 MPa; breaking strength 210 MPa; <br> PE100 (dome overmolding) <br> Tensile E modulus 800 MPa; ||
| Bearing: | Fixed clamping on the surface of PA sleeve <br> Fixed clamping on the surface of PE molding |
| Stresses: | Internal pressure 16 bar. Torque 250 Nm |
| Results ||
| Calculation internal pressure max PS | Calculation torque max PS |
|  |  |
| Detail view principle stress | Detail view principle stress |
|  |  |
| Maximum principle stress: +8.47E+01 <br> Minimum principle stress: -4.38E+00 <br> Legend: 0N/mm² to 80N/mm²; | Maximum principle stress: +2.51E+02 <br> Minimum principle stress: -1.37E+03 <br> Legend: 0N/mm² to 80N/mm²; |
| Remarks: ||

Fig. 4b

FEM Calculation
- "pulling triangles" with internal pressure and torque -

| Model name: | RD_DN100_VAR01 | Creator: T 416 | Date: 10.01.2008 |
|---|---|---|---|
| Calculation object: simulation internal pressure 16 bar and torque 250 Nm ||||
| Material indication: Bronze (from Mechanica Bib.) (drive segment)<br>Grivory GV 4H (Polyamide with 40% glass fiber fraction) (dome-shaped casing)<br>Tensile E modulus 13000 MPa; breaking strength 210 MPa;<br>PE100 (dome overmolding)<br>Tensile E modulus 800 MPa; ||||
| Bearing: | Fixed clamping on the surface of PA sleeve<br>Fixed clamping on the surface of PE molding |||
| Stresses: | Internal pressure 16 bar. Torque 250 Nm |||
| Results ||||
| Calculation internal pressure max PS || Calculation torque max PS ||
|  ||  ||
| Detail view principle stress || Detail view principle stress ||
|  ||  ||
| Maximum principle stress: +5.189E+01<br>Minimum principle stress: -6.131E+00<br>Legend: 0N/mm² to 80N/mm²; || Maximum principle stress: +4.356E+02<br>Minimum principle stress: -4.915E+02<br>Legend: 0N/mm² to 80N/mm²; ||
| Remarks: ||||

Fig. 4c

FEM Calculation
- "corners rounded" with internal pressure and torque -

| Model name: | RD_DN100_VAR11 | Creator: T 416 | Date: 10.01.2008 |
|---|---|---|---|
| Calculation object: simulation internal pressure 16 bar and torque 250 Nm ||||
| Material indication: | Bronze (from Mechanica Bib.) (drive segment)<br>Grivory GV 4H (Polyamide with 40% glass fiber fraction) (dome-shaped casing)<br>Tensile E modulus 13000 MPa; breaking strength 210 MPa;<br>PE100 (dome overmolding)<br>Tensile E modulus 800 MPa; |||
| Bearing: | Fixed clamping on the surface of PA sleeve<br>Fixed clamping on the surface of PE molding |||
| Stresses: | Internal pressure 16 bar. Torque 250 Nm |||
| Results ||||
| Calculation internal pressure max PS || Calculation torque max PS ||
|  ||  ||
| Detail view principle stress || Detail view principle stress ||
|  ||  ||
| Maximum principle stress: +4.823E+01<br>Minimum principle stress: -5.092E+00<br>Legend: 0N/mm² to 80N/mm²; || Maximum principle stress: +2.452E+02<br>Minimum principle stress: -4.384E+02<br>Legend: 0N/mm² to 80N/mm²; ||
| Remarks: ||||

DRIVE CARTRIDGE

BACKGROUND OF THE INVENTION

The invention relates to a drive cartridge comprising an actuating mechanism, in which a spindle can be guided in a hollow cylindrical drive element between two end positions and an axial distance from another, said positions being defined by the axial length of the drive element; and to a dome-shaped casing that surrounds the drive element in a non-rotatable and non-displaceable manner.

In particular in the area of industrial water and/or waste water, pipeline systems made of thermoplastic polymers, such as polyethylene, are preferred, since they are durable, resistant to corrosion and easy to handle. Also certain components, such as shut-off fittings, are manufactured from thermoplastic polymers to a large extent for optimal connection to the pipeline system.

DE 10 2006 030 027 A1, for example, shows a shut-off fitting of which the housing can be manufactured from a thermoplastic polymer, such as polyethylene, wherein the actuating mechanism and a sleeve surrounding said actuating mechanism consist of metal. An upper and a lower stopper means made of metal signal the open end closed positions of obturators which are actuated by means of said actuating mechanism. This metal sleeve, also referred to as a dome, is molded with a thermoplastic polymer so that bonding to the housing is possible and thereby forms, as a sub-assembly of the shut-off fitting, a drive cartridge which is connected to said housing by means of electrofusion technique. In order to prevent that said metal sleeve separates from the surrounding polyethylene due to occurring stresses, the sleeve is provided on its outer surface with toothings which form indentations into which the polymer penetrates. Although a failure proof bonding between metal and polymer is ensured thereby, manufacturing of the metal sleeve, however, is complex and intricate.

In the shut-off valve described in EP 0 711 947 A, the metal valve housing is also molded with polymer, wherein circumferential grooves are provided to enhance anchoring. To prevent rotation of the valve housing within the polymer, it is formed a hexagon along at least a part of its length.

SUMMARY OF THE INVENTION

It is therefore the object of the invention to optimize construction of the drive cartridge in a shut-off fitting and, in particular, to simplify the complex and intricate transition from the metal sleeve to the polymer housing which to date has been realized by the above mentioned overmold with for example polyethylene.

This object is solved by a drive cartridge as defined in claim 1. According to the invention, the drive element has an external contour with out-of-roundness profile, and the internal contour of the dome-shaped casing has a positive fit only in those areas of the drive element in which the permissible normal stress exceeds a predefined upper limit. Guiding surfaces are formed at the out-of-roundness profile which receive forces and torques which are the origin of the normal stress. Predetermined values of torques which must be received by a shut-off fitting, are—normally defined by standards—at 250 Nm or above, considering a factor of 2 as margin of safety, at up to 500 Nm. In a shut-off fitting, the dome-shaped casing has essentially the decisive task of receiving forces and torques during operation of the shut-off fitting and ensuring gas tightness or fluid tightness, respectively, towards the outside. Torques can be safely transferred to the dome-shaped casing only if the surface pressure does not exceed the maximum admissible value of the material. Therefore, normal stresses are produced by the torque to be expected on the one hand and materials as used on the other hand, which lead to crack formation of the drive cartridge if it is inadequately configured, so that the drive cartridge or the shut-off fitting, respectively, is rendered unusable due to the fact that gas tightness or fluid tightness, respectively, can no longer be ensured. The invention uses this finding by providing that only those areas of drive element and dome-shaped casing participate in transmission of forces which stand the stress, in which therefore the admissible normal stress exceeds a predefined limit.

Methods for calculating normal stresses on basis of the used materials and forces and torques to be expected are known; they normally use the finite element method (FEM).

According to the invention, the normally substantially cylindrical structure of drive element and dome-shaped casing is replaced by a structure which uses the advantages of out-of-roundness profiles.

"Out-of-roundness profile" thereby means that the outer circumference of the drive element, in cross sectional view, even though free of corners, deviates from a pure circular shape. Out-of-roundness profiles are in particular those which show an eccentricity.

Preferably, the out-of-roundness profile is a polygon profile. For such profiles, the eccentricity comprises a constant value during generation of the curve. Polygon profiles correspond to a polygon in cross-section, however, the corners are rounded. Such polygon profiles are often utilized as a shaft-hub-connection. They underlie standards DIN 32711 and DIN 32712. Thus, DIN 32712 defines polygon profile P4C which is formed of radii, namely of four large ones which contact an inscribed circle and four smaller ones which lie exactly on the circumference. This profile is preferably utilized in the present application.

As an alternative, the out-of-roundness profile may be a profile on basis of complex cycloids. During generation of the curve, a periodic variation of eccentricity takes place. Depending on the type of the eccentricity function, a distinction is made between complex epicycloids, complex hypocycloids and hybrid complex cycloids. For details, it is referred to "Numerische Untersuchung von unrunden Profilkonturen für Welle-Nabe-Verbindungen (Numerical investigation of out-of-roundness profile contours for shaft-hub-connections) ", diploma thesis Andreas Maiwald, Westsächsische Hochschule Zwickau (FH), September 2008. Such profiles on basis of complex cycloids unify the advantages of polygon profiles with those of spline shaft profiles. By variation of parameters, the profile can be adapted to respective needs.

According to the invention, the dome-shaped casing is adapted to the selected profile of the drive element and is preferably built up of a profile element adjoining the drive element and an outer skin surrounding the profile element.

Preferably, the profile element consists of a partially aromatic thermoplastic comprising a fraction of reinforcing fibers of at least 20 weight %.

Such a material is provided by EMS-Chemie AG, 7013 Domat/Ems (Switzerland) and is distributed under the trade name Grivory GV. A quality suitable for drinking water contact is presented in EMS-Chemie AG: Technisches Merkblatt, Grivory HT1V-4FWA schwarz 9225; Domat/Ems (Switzerland), 2006, p. 1-5—company note. The material can be processed by injection molding, so that elaborate surface treatments are unnecessary. The polymer matrix is reinforced by glass fibers, so that it is possible to achieve at strength levels of commercially available die-casting alloys. Qualities are available which have a fraction of glass fibers between 20 and 60 weight %. Use of this materials in a one-piece homogeneous inner housing of a sanitary fitting is known from EP 1 852 558 A1. A pressure vessel made of Grivory HTV-5H1 is described in DE 102 07 613 C1. This material, however, can not be utilized in the area of industrial water and/or waste water without hesitation in case of a compound with other materials, because again the problem is present that a gas or fluid tight connection, respectively, must be produced between the used materials.

From WO 02/094536 A1 it is known to fabricate piston seals by co-extruding Grivory GV-2H with polyurethane elastomer.

After all, it is thus further provided according to the invention that the outer skin consists of a fusable thermoplastic polymer which can additionally be co-extruded with the partially aromatic thermoplastic. A suitable thermoplastic is polyethylene, wherein the polyethylene is mixed with a bonding agent to achieve at a chemical bonding to the profile element. Production of the dome-shaped casing takes place in a one step process as a 2K component in an injection molding tool.

According to a further embodiment, the bonding agent may be applied to the profile element and/or the outer skin on those areas which are to be bonded and may be activated by means of pressure and heat.

It may also be appropriate to provide a multilayer structure comprising at least one layer made of partially aromatic thermoplastic (with fiber fraction), one layer made of thermoplastic polymer containing bonding agent and one layer made of thermoplastic polymer.

According to a preferred embodiment, the profile element may be configured to comprise a substantial constant wall thickness.

However, it may be equally advantageous to confer a varying wall thickness to the profile element. When decreasing the wall thickness, deformability increases, so that stress peaks may be absorbed better. Thereby, principles of bionics may be applied, for example, to generate profiles with the aid of computer simulation having as far as possible a homogeneous stress distribution and surfaces free of any notch stress, wherein the self-optimizing growth and repair mechanism of trees or bones might be taken as a basis, as proposed in "Bionik-Trends in Industrie und Gesellschaft und Anwendungen bei der Continental AG (Bionic trends in industry and society and applications within Continental AG)", June 2002.

Furthermore, preferably one or more exposed areas of the profile element where the profile element does not abut to the drive element, comprise slopes. These slopes form, on the one hand, the required demold slopes for the injection molding process in the areas of low stress. During utilization, they serve rinsing purposes.

By using the drive cartridge according to the present invention, it succeeds surprisingly in a shut-off fitting, for example according to DE 10 2006 030 027 A1, to replace the existing sleeve overmolded with polyethylene completely by a dome-shaped casing which does no longer comprise any metal fractions. Rather, it is produced by using a partially aromatic thermoplastic comprising a fraction of reinforcing fibers, for example glass fibers, of at least 20 weight %, preferably at least 40 weight %. Apart from the utilization of glass fibers, use of carbon fibers, aromate fibers or the like or combinations thereof is conceivable. The partially aromatic thermoplastic may be a polyamide which can be present totally amorphous or in a partially crystalline state.

Connection to the drive cartridge according to the invention to the housing of a shut-off fitting may now be achieved in a simple manner for example by electric welding. Preferably, it is worked by means of electrofusion technique.

BRIEF DESCRIPTION OF THE DRAWINGS

The invention will be further explained below with the attached drawing. It is shown in.

DETAILED DESCRIPTION OF THE INVENTION

Figure 1:
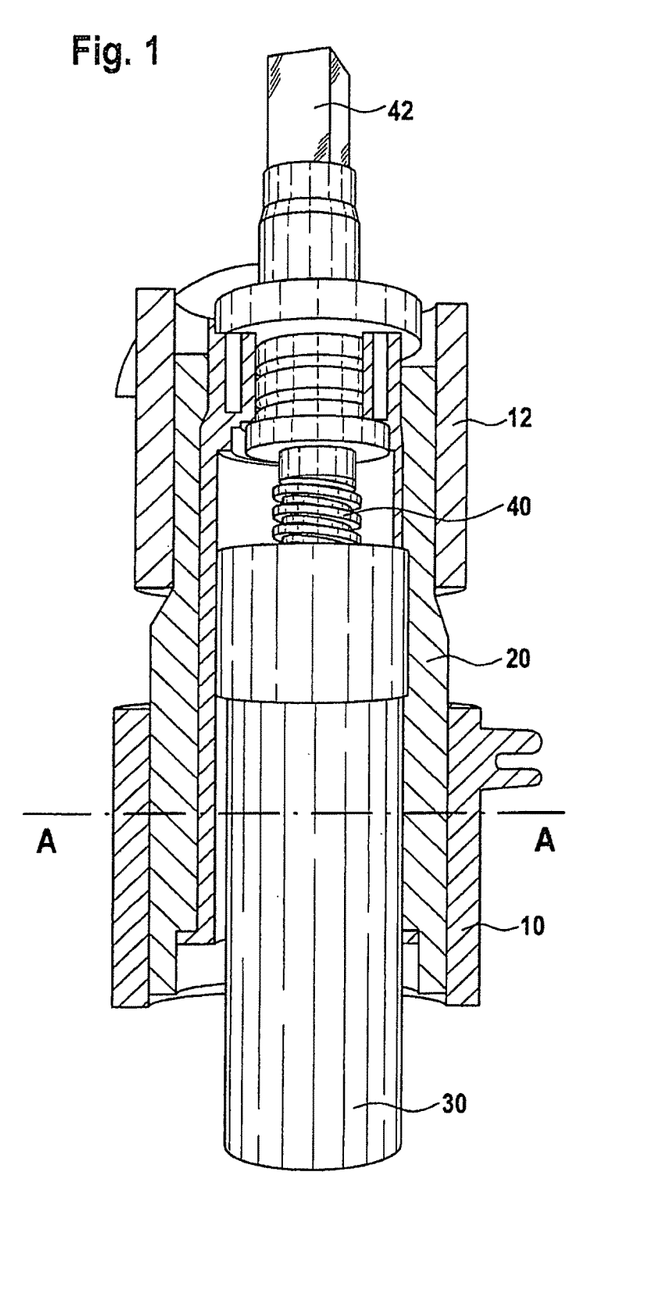
FIG. 1 a partial longitudinal sectional view of a shut-off fitting comprising a drive cartridge according to the present invention.

FIG. 1 shows a partial view of a shut-off fitting in the region of the drive cartridge. The actuating mechanism, consisting of a guiding sleeve 30 as drive element and a spindle 40 which can be moved therein by means of a drive square 42 is located within a dome-shaped casing 20, which is constructed from a profile element 22 and an outer skin 24 surrounding said profile element 22, as can be better recognized in FIGS. 2 and 3. Profile element 22 thereby consists of a partially aromatic thermoplastic having a fraction of reinforcing fibers, such as glass fibers, carbon fibers, aramide fibers or combinations thereof, of at least 20 weight %, however preferably of 40 weight % and above. Bonding of dome-shaped casing 20 to the surrounding housing 10, 12 may thereby be achieved by means of traditional techniques, such as electrofusion. Preferably, a bonding agent is used at the interfaces of dome-shaped casing 20 and surrounding housing 10, 12. As an alternative, outer skin 24 may contain a bonding agent, which, on the one hand, provides for chemical bonding to profile element 22 and, on the other hand, simplifies the fusion process to housing 10, 12. A respective stopper means for defining the closed or open position, respectively, of one or more obturators (not shown) may optionally be formed at spindle 40. In particular, lower stopper means of the actuating mechanism is not integrated into the dome-shaped casing 20 but is transferred to spindle 40 via a stopper nut, so that the polymer construction is relieved. The obturators may be screwed into threads at the lower end of the drive element, as it is known per se.

Figure 2:
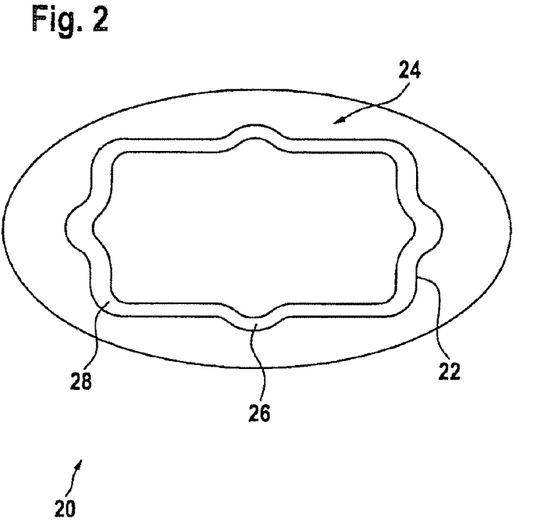
FIG. 2 a cross sectional view taken along line A-A of FIG. 1, wherein the actuating mechanism has been omitted.
Figure 3:
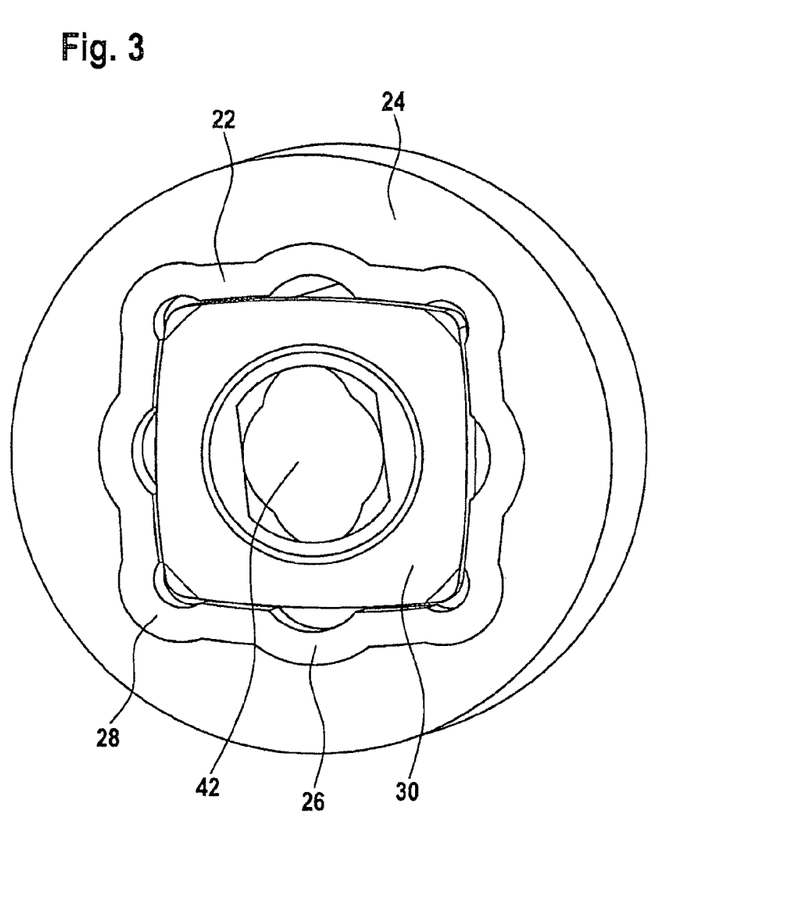
FIG. 3 a sectional view similar to FIG. 2, however comprising the actuating mechanism.

First, the polygon profile of profile element 22 absorbs torque stresses during operation of the actuating mechanism and contributes to creep strength by its profile shape. Furthermore, the polygon profile represents guidance and rotating security of the actuating mechanism.

In a practical embodiment, as shown in FIGS. 2 and 3, the profile element is a polygon profile P4C according to DIN 32712 which preferably comprises a substantially constant wall thickness. In the centers of sides of the dome-shaped casing, protrusions 26 are running in longitudinal direction of the casing which correspond to exposed areas with respect to the drive element, i.e. areas in which profile element 22 does not abut at drive element 30. These exposed areas are provided in those regions in which only relatively low stresses occur. They are provided with the required demolding slopes for injection molding and serve rinsing purposes during use. Similar exposed areas 28 are also located in the longitudinal edge region of the polygon profile.

Figure 4A:
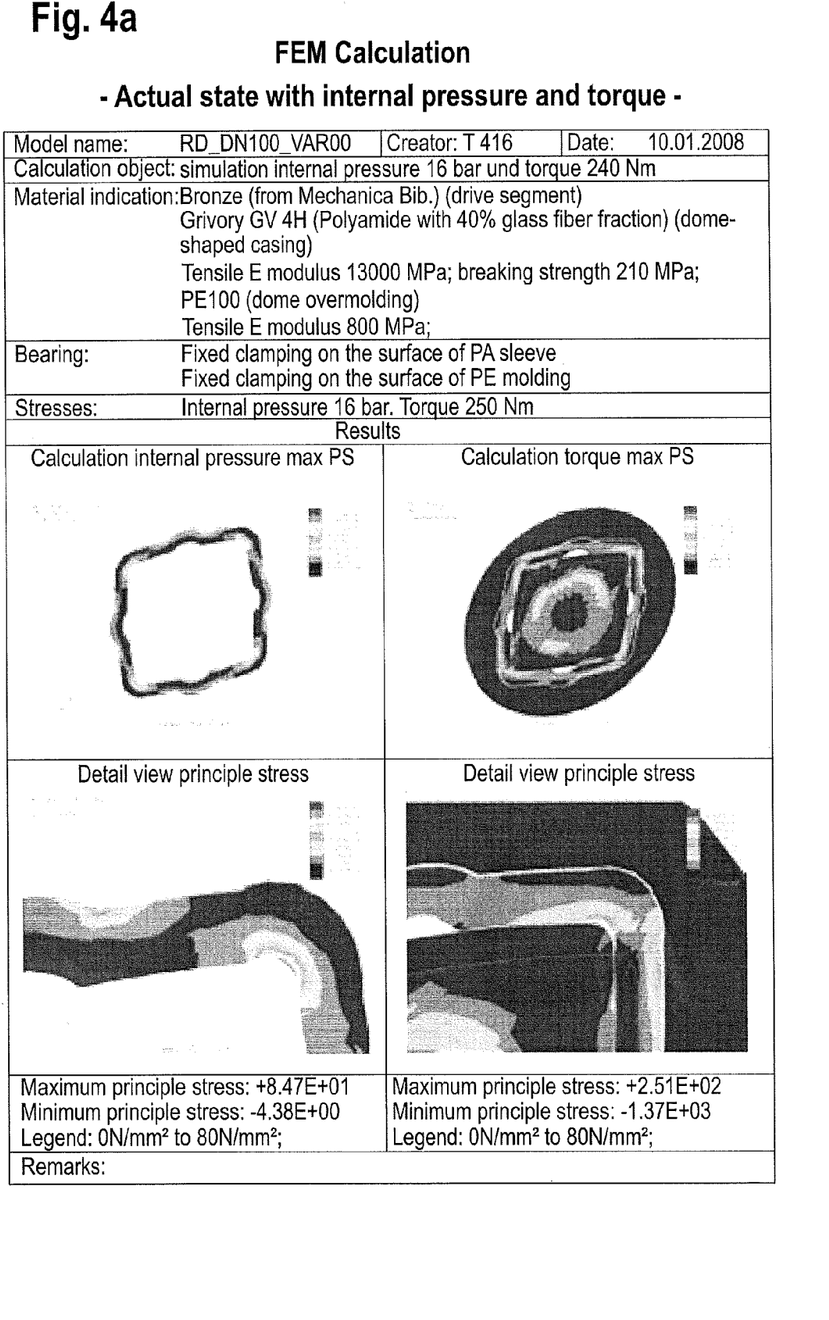
FIGS. 4a, 4b and 4c simulations of different configurations of a dome-shaped casing.
Figure 4B:
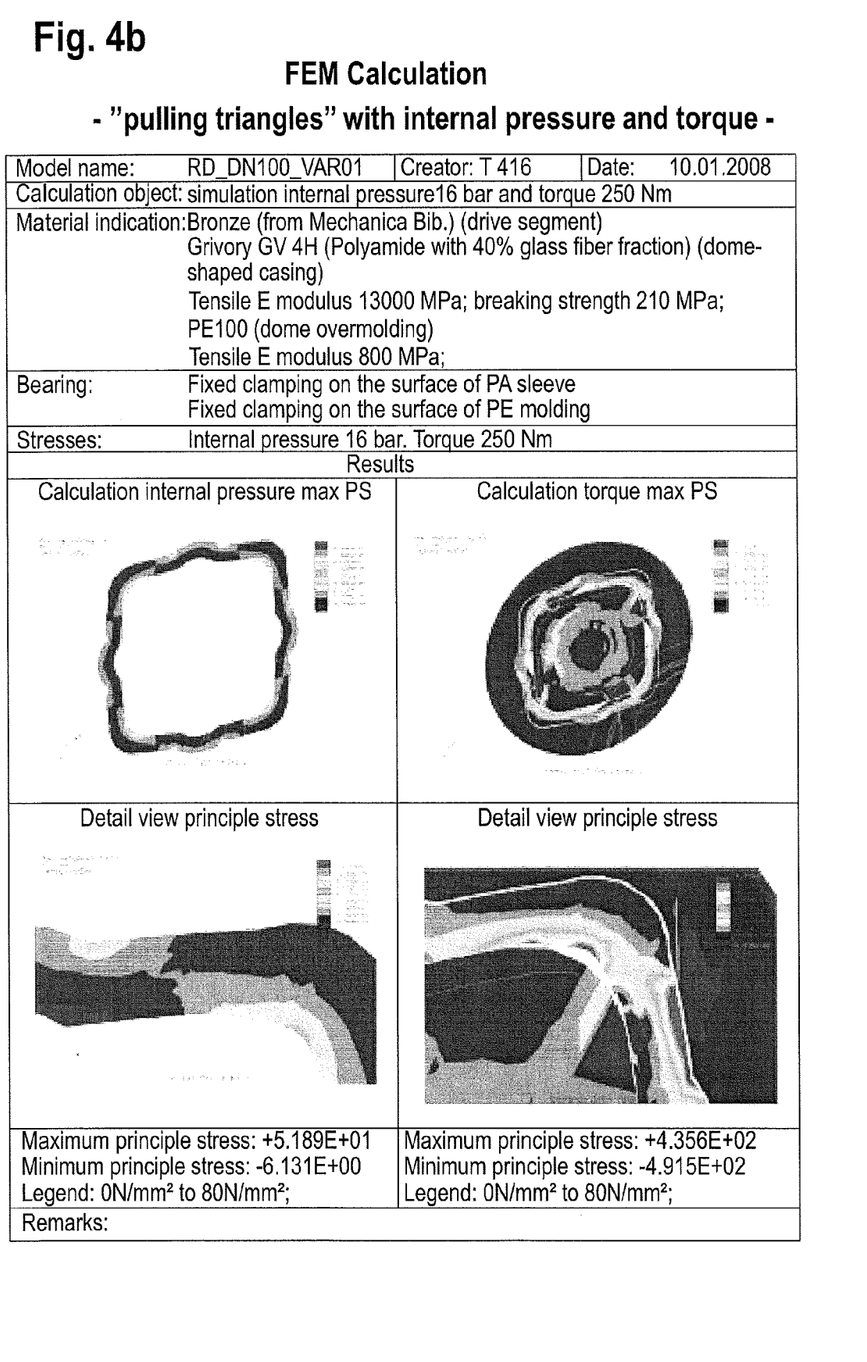
Figure 4C:
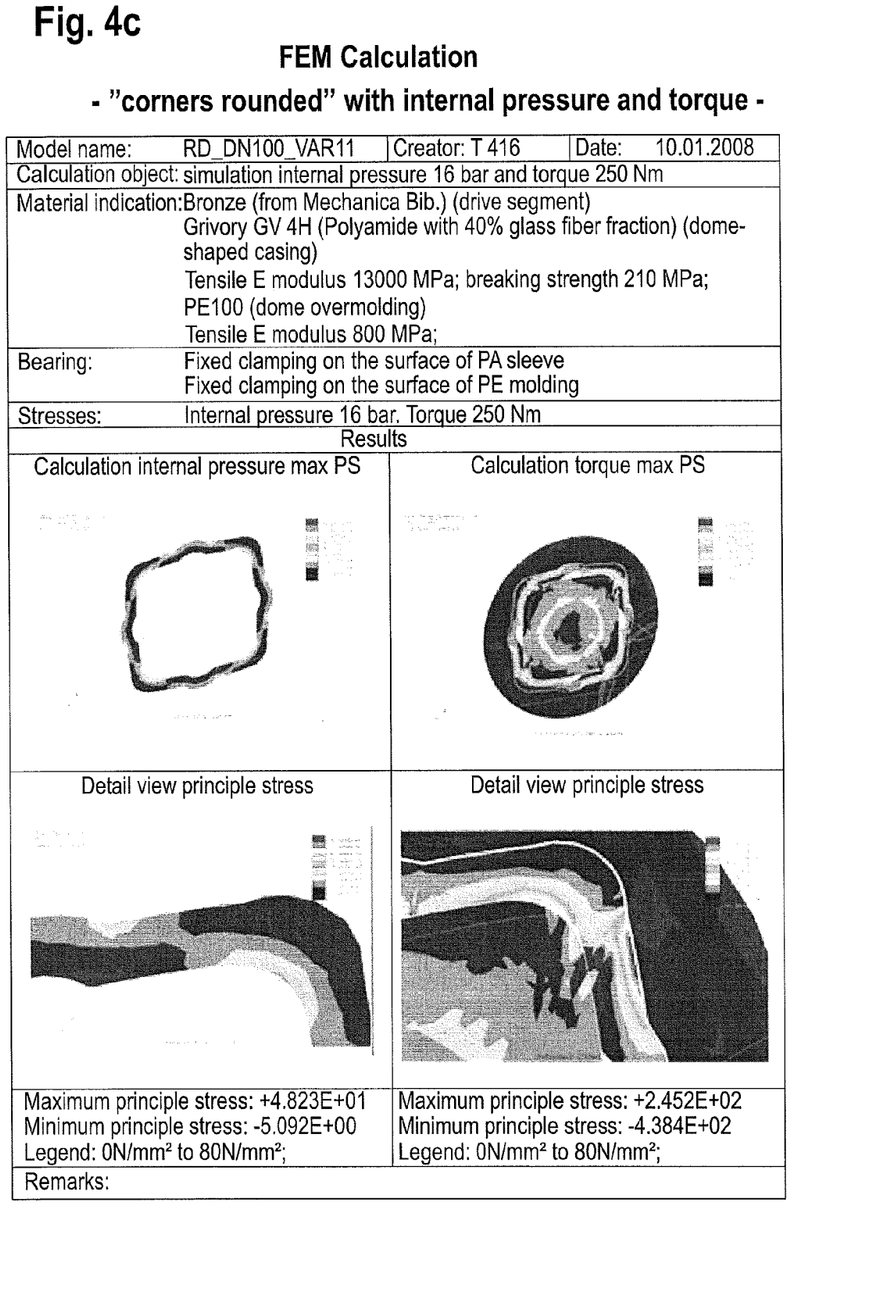

FIGS. 4a, 4b and 4c show simulations which have been performed for optimizing the profile of dome-shaped casing 20. FIG. 4a summarizes the situation in which the polygon is rounded in its edge regions, with uniform wall thickness. This contour has proven to be ideal with respect to torsion stresses. FIG. 4b shows a situation with reinforced roundings in the edge region, leading to an optimization with respect to internal pressure and torsion stress. Formation of so-called "pulling triangles", as illustrated in FIG. 4c, shows comparable values for internal pressure, however a worse torsion behavior.

The shut-off fitting with drive cartridge according to the invention was subjected to an endurance test which showed only very low abrasion on the sleeve. Operation torques in the range of 250 Nm to 500 Nm were absorbed. A test according to DIN EN 12201-4 (falling ball test, resistance against mechanical impact) was concluded positively. No cracks could be detected after the test.

The features disclosed in the foregoing description, in the claims and/or in the accompanying drawings may, both separately and in any combination thereof, be material for realising the invention in diverse forms thereof.

The invention claimed is:

1. A drive cartridge, comprising
an actuating mechanism, in which a spindle can be guided in a hollow cylindrical drive element between two end positions at an axial distance from another, said positions being defined by the axial length of the drive element; and
a dome-shaped casing that surrounds the drive element in a non-rotatable and non-displaceable manner;
wherein said drive element comprises an outer contour having a out-of-roundness profile and that the internal contour of said dome-shaped casing has a positive fit only in those areas of the drive element in which the permissible normal stress exceeds a predefined upper limit; and
wherein said dome-shaped casing is constructed of a profile element adjoining the drive element and an outer skin surrounding said profile element.

2. The drive cartridge of claim 1, wherein said out-of-roundness profile is a polygon profile.

3. The drive cartridge of claim 2, wherein said polygon profile is a P4C profile.

4. The drive cartridge of claim 1, wherein said out-of-roundness profile is a profile on basis of complex cycloids.

5. The drive cartridge of claim 1, wherein said profile element consists of a partially aromatic thermoplastic having a fraction of reinforcing fibers of at least 20 weight %.

6. The drive cartridge of claim 5, wherein said outer skin consists of a fusible thermoplastic polymer which furthermore can be co-extruded with said partially aromatic thermoplastic.

7. The drive cartridge of claim 6, wherein thermoplastic polymer contains a bonding agent for producing a chemical bonding at least with said partially aromatic thermoplastic.

8. The drive cartridge of claim 6, wherein said a bonding agent is applied to the profile element and/or said outer skin on the areas to be bonded together.

9. The drive cartridge of claim 6, wherein said dome-shaped casing comprises a layer of thermoplastic polymer containing a bonding agent which is disposed between said profile element and said outer skin.

10. The drive cartridge of claim 1, wherein said profile element comprises an essentially constant wall thickness.

11. The drive cartridge of claim 1, wherein said profile element comprises a varying wall thickness.

12. The drive cartridge of claim 11, wherein said wall thickness is optimized according to the principles of bionics.

13. The drive cartridge of claim 1, wherein one or more exposed areas of said profile element where said profile element does not abut to said drive element, comprise slopes.

* * * * *

UNITED STATES PATENT AND TRADEMARK OFFICE
CERTIFICATE OF CORRECTION

PATENT NO.        : 8,573,082 B2                                                Page 1 of 1
APPLICATION NO.   : 12/998496
DATED             : November 5, 2013
INVENTOR(S)       : Schwartz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this
Twenty-second Day of September, 2015

Michelle K. Lee
*Director of the United States Patent and Trademark Office*